United States Patent [19]

Abrant et al.

[11] Patent Number: 4,703,421

[45] Date of Patent: Oct. 27, 1987

[54] READY LINE SYNCHRONIZATION CIRCUIT FOR USE IN A DUPLICATED COMPUTER SYSTEM

[75] Inventors: Robert J. Abrant, Villa Park, Ill.; Michael D. Martys, Pittsfield, Mass.; George K. Tarleton, Itasca, Ill.

[73] Assignee: GTE Communication Systems Corporation, Northlake, Ill.

[21] Appl. No.: 815,976

[22] Filed: Jan. 3, 1986

[51] Int. Cl.[4] ............ G06F 15/16; G06F 11/00; G05B 15/08; G05B 19/18
[52] U.S. Cl. ............................ 364/200; 364/133; 371/9
[58] Field of Search ... 364/200 MS File, 900 MS File, 364/133, 132; 371/9

[56] References Cited

U.S. PATENT DOCUMENTS

| | | | |
|---|---|---|---|
| 3,602,900 | 8/1971 | Pain et al. | 364/200 |
| 3,810,119 | 5/1974 | Zieve et al. | 364/200 |
| 3,898,621 | 9/1975 | Zelinski et al. | 364/200 |
| 3,909,795 | 9/1975 | Chang et al. | 364/200 |
| 4,196,470 | 4/1980 | Berg | 364/200 |
| 4,197,580 | 4/1980 | Chang et al. | 364/200 |

Primary Examiner—Raulfe B. Zache
Assistant Examiner—William G. Niessen
Attorney, Agent, or Firm—Gregory G. Hendricks; Robert J. Black

[57] ABSTRACT

A synchronizing circuit synchronizes the asynchronous ready signals for two separate microprocessor subsystems that are running synchronously as part of a fault tolerant computer system. Duplicated synchronization circuits, confined in a master-slave arrangement, are utilized with the duplicate microprocessors. Storage and gating circuitry are used to provide the precise timing signals required for such synchronization.

23 Claims, 2 Drawing Figures

READY LINE SYNCHRONIZATION CIRCUIT FOR USE IN A DUPLICATED COMPUTER SYSTEM

FIELD OF THE INVENTION

The present invention relates to synchronously operating microprocessors and more particularly to circuit for synchronizing asynchronous ready signals for use by duplicated microprocessors, thereby allowing them to enter into synchronous operation.

BACKGROUND OF THE INVENTION

The typical arrangement for use of synchronous microprocessors is to run both microprocessors asynchronously and compare the results of their operations at the end of each task. The faster microprocessor is then allowed to wait for a period of time while the slower microprocessor presents its results to a comparison circuit. Thus, the microprocessors are not actually run in synchronism, but rather, the microprocessors are continuously resynchronized after a predetermined number of operations.

The present invention enables two microprocessors to actually be run synchronously with their address, date and status bits being compared during each bus cycle.

SUMMARY OF THE INVENTION

In accordance with the present invention, a synchronization circuit is provided for use in a computer system including duplicated microprocessors, duplicated subsystems and duplicated synchronization circuits configured in a master-slave arrangement, each synchronization circuit associated with one of the microprocessors and one of the subsystems, the microprocessors being operated to provide clock pulses and periodic instruction status signals, and the subsystems being operated to provide an asynchronous ready signal, the synchronization circuit comprises clock pulse storage means connected to the associated microprocessor and operated in response to the clock pulses to provide divided clock pulses; also included is status signal storage means connected to the associated microprocessor and operated in response to the status signal to provide a stored status signal.

Asynchronous ready signal storage means is included and it is connected to the associated subsystem, the clock pulse storage means and the status signal storage means. It is operated in response to the asynchronous ready signal, one of the divided clock pulses and one of the stored status signals from the same synchronization circuit when operated as a master synchronization circuit, or from the master synchronization circuit when operated as a slave synchronization circuit, to provide a stored asynchronous ready signal.

Synchronization means is further included and it is connected to the other synchronization circuit, the clock pulse storage means, the status signal storage means and the asynchronous ready signal storage means. It is operated in response to one of the divided clock pulses, one of the stored status signals and the stored asynchronous ready signal from the asynchronous ready signal storage means in both the same and the duplicated synchronization circuits to provide a synchronized ready signal.

DESCRIPTION OF THE PREFERRED EMBODIMENT

Figure 1:
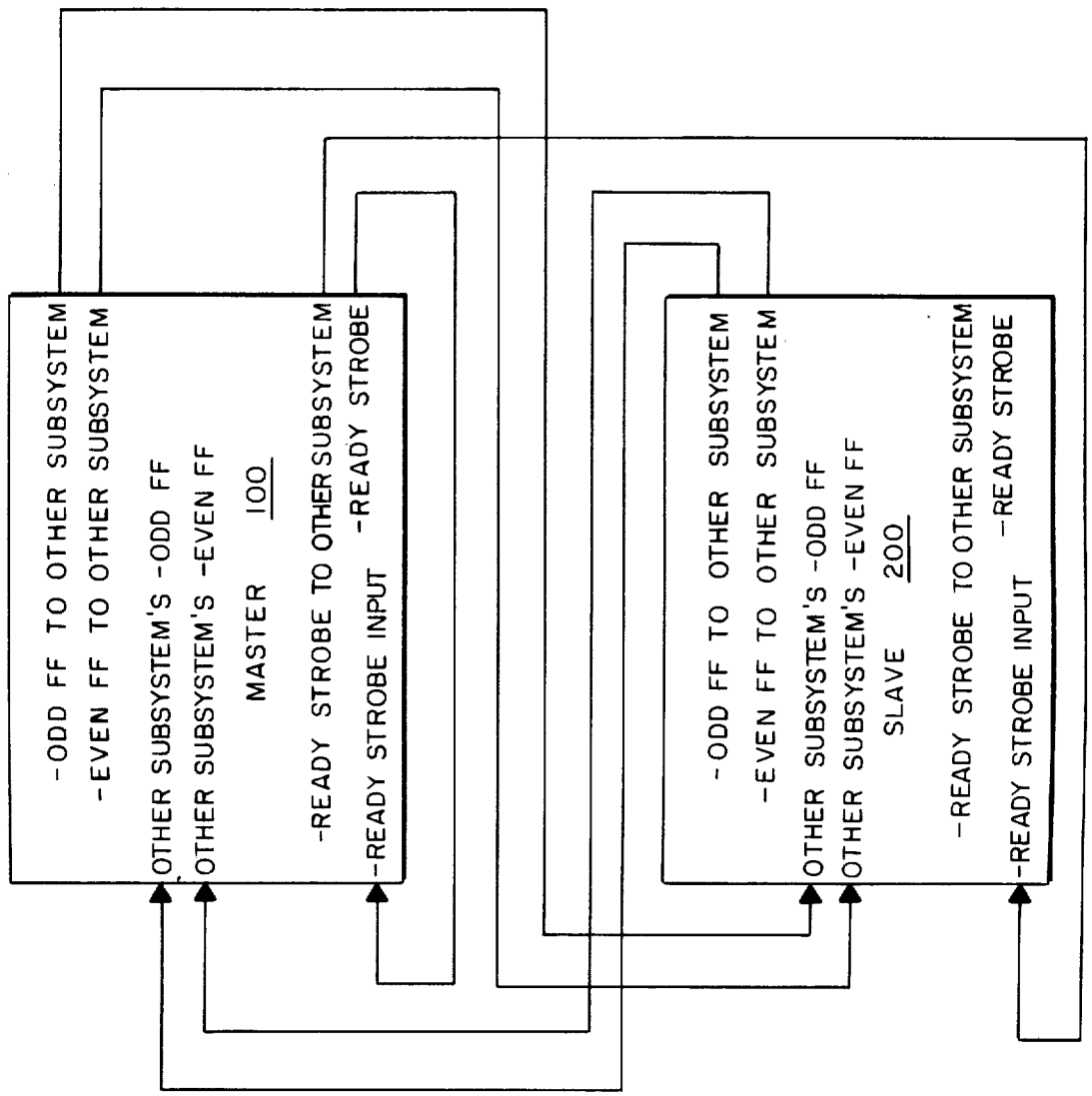
FIG. 1 of the accompanying drawing is a block diagram of a master-slave arrangement of ready line synchronization circuits in accordance with the present invention.

Referring now to FIG. 1 the master and slave ready line synchronization circuits are shown. Master synchronization circuit 100 is shown connected to slave synchronization circuit 200. Each of these synchronization circuits are identical and each is associated with a different one of duplicated microprocessors. These microprocessors run in synchronization in response to the synchronized ready signals provided by these master and slave ready line synchronization circuits.

Each synchronization circuit includes output signals -ODD FF TO OTHER SUBSYSTEM, -EVEN FF TO OTHER SUBSYSTEM, -READY STROBE TO OTHER SUBSYSTEM and -READY STROBE. However, as indicated in the drawing, the -READY STROBE TO OTHER SUBSYSTEM and -READY STROBE signals provided by the slave synchronization circuit are not used. Each such synchronization circuit further includes input signals OTHER SUBSYSTEMS ODD FF, -OTHER SUBSYSTEMS EVEN FF and -READY STROBE input.

As is shown in FIG. 1, -OTHER SUBSYSTEM'S ODD FF and -OTHER SUBSYSTEM'S EVEN FF input signals for slave synchronization circuit 200 originate as output signals -ODD FF to OTHER SUBSYSTEM'S and -EVEN FF to OTHER SUBSYSTEM, respectively, from master synchronization circuit 100. Similarly the -OTHER SUBSYSTEM'S-ODD FF and OTHER SUBSYSTEM'S-EVEN FF input signals for master synchronization circuit 100 originate as output signals -ODD FF to OTHER SUBSYSTEM and -EVEN FF to OTHER SUBSYSTEM, respectively, from slave synchronization circuit 200.

The -READY STROBE input signal for master synchronization circuit 100 originates as the -READY STROBE output signal of that synchronization circuit, while the -READY STROBE input signal of slave synchronization circuit 200 originates as the -READY STORBE to OTHER SUBSYSTEM output signal from master synchronization circuit 100. The ready strobe signals are so arranged as shown in FIG. 1 in order to operate the duplicated synchronization circuits in a master-slave arrangement.

Figure 2:
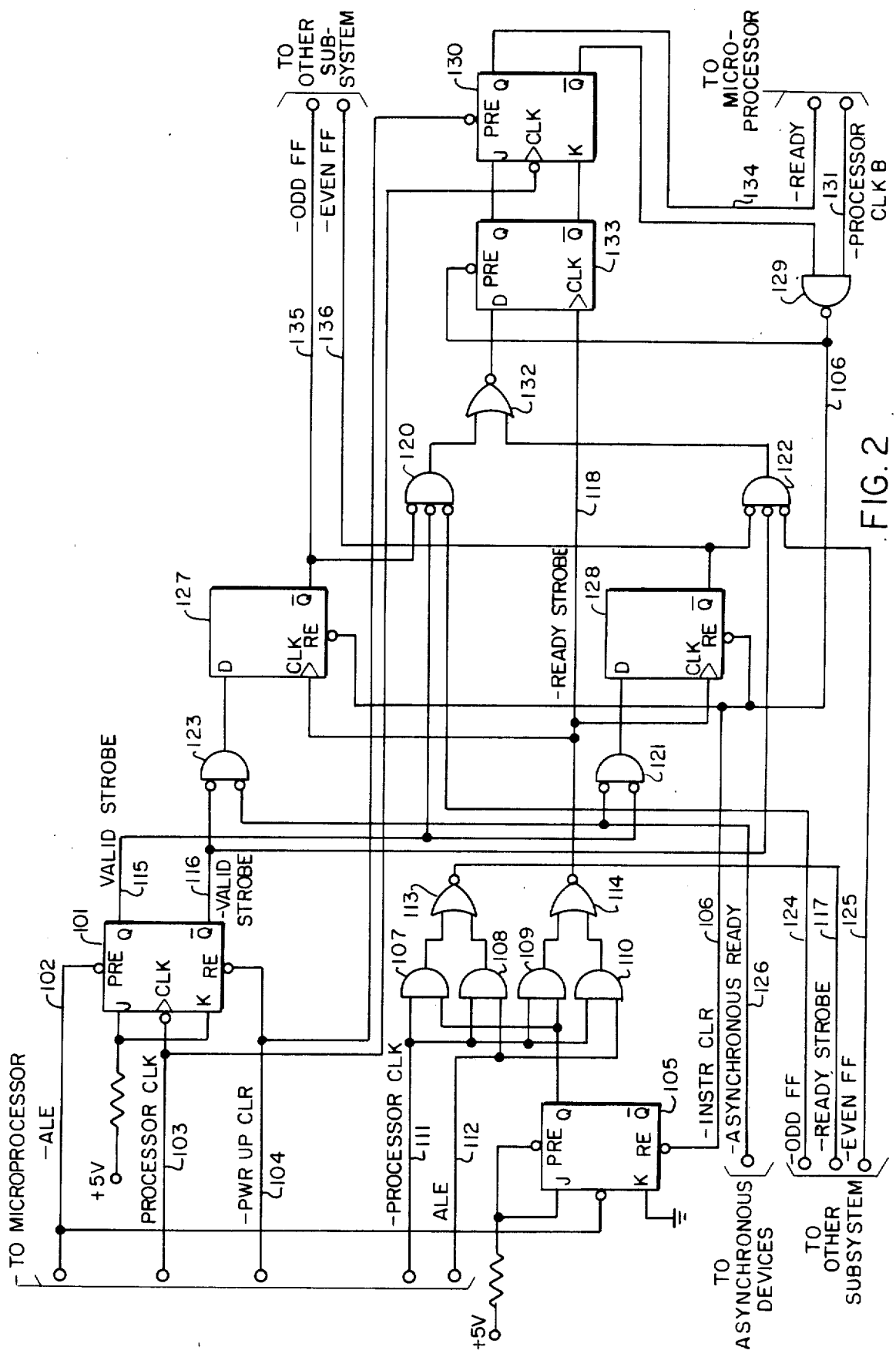
FIG. 2 is a schematic diagram of a ready line synchronization circuit in accordance with the present invention.

Referring now to FIG. 2 the preset (PRE) clock (CLK) and reset (RE) inputs of J-K flip-flop 101 are shown connectable to the associated microprocessor by leads 102, 103 and 104, respectively, while the J and K inputs of this flip-flop are connected to a +5 volt source. The clock input of J-K flip-flop 105 is shown connectable to the associated microprocessor via lead 102 and the reset (RE) input is connected to lead 106. The J and preset (PRE) inputs of this flip-flop are connected to a +5 volt source while the K input is connected to ground.

The first input of AND gates 107-110 are connectable to the associated microprocessor via lead 111 while the second input of AND gates 107 and 109 are connected to the $\overline{Q}$ output of flip-flop 105 and the second input of AND gates 108 and 110 are connectable to the associated microprocessors via lead 112. The inputs of NOR gate 113 are connected to the output of AND gates 107 and 108, while the inputs of NOR gate 114 are connected to the outputs of AND gates 109 and 110. J-K flip-flop 101 provides a VALID STROBE signal on lead 115 which is connected to its $\overline{Q}$ output and it also provides a -VALID STROBE signal on lead 116 which is connected to its $\overline{Q}$ output. NOR gate 113 provides a -READY STROBE TO OTHER SUBSYSTEM signal on lead 117 and NOR gate 114 provides a -READY STROBE signal on lead 118.

The Q output of J-K flip-flop 101 is connected to the middle input of AND function gate 120 and the second input of AND function gate 121 via lead 115. Similarly, the $\overline{Q}$ output of J-K flip-flop 101 is connected to the first input of AND function gate 123 via lead 116. The third input of AND function gate 120 is connected to the other subsystem via lead 124 while the third input of AND function gate 122 is connected to the other system via lead 125. AND function gates 121 and 123 are further connected to asynchronous devices via lead 126.

The clock inputs of D-type flip-flops 127 and 128 are connected to NOR gate 114 via lead 118. The D input of flip-flop 128 is connected to the output of AND function gate 121. The reset (RE) inputs of these flip-flops are connected to the output of NAND gate 127 via lead 106. A first input of this NAND gate is connected to the $\overline{Q}$ output of J-K flip-flop 130 while a second input of this NAND gate is connectable to the microprocessor via lead 131.

A first input of AND function gates 120 and 122 is connected to the $\overline{Q}$ output of D-type flip-flops 127 and 128, respectively. The outputs of AND function gates 120 and 122 are connected to NOR gate 132 whose output is connected to the D input of D-type flip-flop 133. The clock input of this flip-flop is connected to NOR gate 114 via lead 118 while the preset (PRE) input of this flip-flop is connected to NAND gate 129 via lead 106. The Q and $\overline{Q}$ outputs of this flip-flop are connected to the J and K inputs of J-K flip-flop 130, while the clock and set (PRE) inputs of flip-flop 130 are connectable to the microprocessor via leads 103 and 104, respectively. The Q output of flip-flop 130 is connectable to the microprocessor via lead 134 while the $\overline{Q}$ outputs of D-type flip-flops 127 and 128 are connectable to the other system via leads 135 and 136.

When the synchronization circuit is connected as indicated in FIG. 2 and power is applied to the circuit J-K flip-flop 101 is reset by the logic level 0 -PWR UP CLR (power up clear) signal that appears at its RE input. This flip-flop is subsequently set in response to a logic level 0 -ALE (address latch enable) signal appearing at its PRE input. Such a signal occurs during every microprocessor instruction cycle. Since the J and K inputs of this flip-flop are connected to a +5 volt source, this flip-flop toggles on the falling edge of every PROCESSOR CLK (processor clock) pulse. Thus, J-K flip-flop 101, in both the master and slave synchronizing circuits, is initially synchronized in response to the -ALE and PROCESSOR CLK signals which are themselves synchronized in the duplicated microprocessors by phase locked loop circuitry.

J-K flip-flop 105 is reset in response to a logic level 0 -INSTR CLR (instruction clear) signal at the end of each microprocessor instruction cycle. This signal causes flip-flop 105 to be initially reset at the beginning of each such cycle. Since the J input of this flip-flop is connected to a +5 volt source, flip-flop 105 provides a logic level 1 signal at its Q output in response to the negative going -ALE signal appearing at its clock input. Thus, flip-flop 105 latches up the -ALE signal and provides a logic level 1 signal at its Q output in response to the negative going edge of the -ALE signal.

The logic level 1 signal at the Q output of this flip-flop then appears at the second input of AND gates 107 and 109, while the logic level 1 ALE signal on lead 112 appears at the second input of AND gates 108 and 110. All four of these AND gates, 107-110, are enabled by a logic level 1 -PROCESSOR CLK signal appearing on lead 111. Thus, AND gates 108 and 110 initially provide a logic level 1 signal at their outputs since the logic level 1 ALE signal appears before a logic level 1 signal appears at the Q output of flip-flop 105. NOR gates 113 and 114 initially detect the logic level 1 signal appearing at the output of AND gates 108 and 110, respectively. NOR gate 113 then applies a logic level 0 -READY STROBE TO OTHER SYBSYSTEM signal to lead 117 and NOR gate 118 applies a logic level 0 -READY STROBE signal to lead 118. Thus, these two READY STROBE signals initially appear in response to the ALE signal appearing on lead 112.

The logic level 0 -ALE signal appearing at the clock input of J-K flip-flop 105 occurs essentially at the same time as the rising edge of the ALE signal on lead 112. However, a propagation delay is introduced by J-K flip-flop 105 before a logic level 1 signal appears at its $\overline{Q}$ output. This logic level 1 signal represents a latched -ALE signal. AND gates 107 and 109 then provide logic level 1 signals in response to the logic level 1 signal at the $\overline{Q}$ output of flip-flop 105 and a logic level 1 -PROCESSOR CLK signal. NOR gates 113 and 114 then provide the same logic level 0 -READY STROBE TO OTHER SUBSYSTEM and -READY STROBE signals as were previously provided in response to the logic level 1 signals from AND gates 108 and 110.

Thus, the setup times required for J-K flip-flop 105 to latch the -ALE signal are avoided since AND gates 108 and 110 enable the ready strobe signals directly and AND gates 107 and 109 continue to enable such signals when the -ALE signal is latched up. Since this propagation delay is avoided, both ready strobe signals have the same pulse width. These ready strobe signals are then terminated when the logic level 0 -INSTR CLR signal is provided at the end of the microprocessor bus cycle. D-type flip-flops 127 and 128 are also reset in response to the logic level 0 -INSTR CLR signal while D-type flip-flop 133 is set in response to that signal. J-K flip-flop 130 is set on the first processor CLK to occur after flip-flop 133 is set.

When a logic level 0 -ASYNCHRONOUSLY READY signal appears on lead 126 from an asynchronous device, this logic level 0 signal also appears at the second input of AND function gate 123 and the first input of AND function gate 121. AND function gate 123 then provides a logic level 1 output signal when a logic level 0 -VALID STROBE signal appears at its first input. AND function gate 121 similarly provides a logic level 1 signal at its output when a logic level 0 VALID STROBE signal appears at its second input. Thus, AND function gate 123 provides a logic level 1 signal in response to an asynchronous ready signal when the VALID STROBE signal is true while AND function gate 121 provides a logic level 1 signal in response to an asynchronous ready signal when the VALID STROBE signal is false.

The logic level 1 signals appearing at the outputs of AND function gates 123 and 121 are then clocked into D-type flip-flops 127 and 128, respectively, in response to the positive going edge of the -READY STROBE signal. These flip-flops then provide logic level 0 signals at their $\overline{Q}$ outputs and consequently, these signals appear at the first input of AND function gates 120 and 122. The logic level 0 signal at the $\overline{Q}$ output of flip-flop 127 is designated as a -ODD FF TO OTHER SUBSYSTEM signal while the logic level 0 signal at the $\overline{Q}$ output of flip-flop 128 is designated as a -EVEN FF TO OTHER SUBSYSTEM signal. These signals appear on leads 135 and 136, respectively. These odd and even signals are handshake signals that are applied to a similar synchronization circuit in the other subsystem.

These signals indicate that this synchronization circuit has detected an asynchronous ready signal. Similarly, the -OTHER SYBSYSTEM'S ODD FF signal and -OTHER SUBSYSTEM'S EVEN FF signal appearing on leads 124 and 125, respectively, indicate that the synchronization circuit of the other subsystem has detected an asynchronous ready signal. The synchronization circuit of each subsystem must provide its own even and odd signals and it must also detect the other subsystem's corresponding even or odd signal before a ready signal can be generated by both synchronization circuits in synchronism.

AND function gate 120 is gated by a logic level 0 VALID STROBE signal while AND function gate 122 is gated by a logic level 0 -VALID STROBE signal. Thus, AND function gate 120 provides a logic level 1 signal in response to a logic level 0 -ODD FF TO OTHER SUBSYSTEM signal from D-type flip-flop 127, a logic level 0 -OTHER SUBSYSTEM ODD FF signal from the corresponding flip-flop in the other subsystem, and a logic level 0 VALID STROBE signal.

Similarly, AND function gate 122 provides a logic level 1 signal in response to a logic level 0 -EVEN FF TO OTHER SUBSYSTEM signal from D-type flip-flop 128, a logic level 0 -OTHER SUBSYSTEM'S EVEN FF signal from the corresponding flip-flop in the other subsystem, and a logic level 0 -VALID STROBE signal. NOR gate 132 then applies a logic level 0 signal to the D input of D-type flip-flop 133 in response to a logic level 1 signal from either or both AND function gates 120 and 122.

Thus, the VALID STROBE signals cause the output of AND functions gates 120 and 122 to stay false until after both synchronization circuits have been clocked by a ready strobe signal. In the master synchronization circuit the -READY STROBE signal is used, while in the slave synchronization circuit signal -READY STROBE TO OTHER SUBSYSTEM from the master is used.

Without the use of such valid strobe signals, different signals could be clocked into D-type flip-flop 133 in the different synchronization circuits. This would cause the two microprocessors to leave their wait states, in response to a ready signal, at different times and therefore, they would not be in synchronism. These valid strobe signals are also required to ensure that any violation of setup times for flip-flops 127 and 128, by the -ASYNCHRONOUS READY signal, do not cause the two synchronization circuits to generate a ready signal at different times.

D-type flip-flop 133 is used to latch up the -ASYNCHRONOUS READY signal from both master and slave subsystems and present it to the J and K inputs of J-K flip-flop 130 which is used to provide the proper setup and hold times required by microprocessors such as the Intel 80286. If the -ASYNCHRONOUS READY signal has not occurred, NOR gate 132 provides a logic level 1 signal at its output, and Q outputs of flip-flops 133 and 120 are '1', thereby providing a logic level 1 -READY signal on lead 134. This logic level 1 -READY signal causes the associated microprocessor to remain in the wait state. The 80286 requires a -READY signal every bus cycle. The logic level 0 signal at the $\overline{Q}$ output of flip-flop 130 also appears at the first input of NAND gate 129, causing it to apply a logic level 1 -INSTR CLR signal on lead 106. This logic level 1 INSTR CLR signal prevents flip-flops 105, 127 and 128 from being reset.

When the -ASYNCHRONOUS READY signal appears at both synchronization circuits, a logic level 0 signal appears at AND function gates 123 and 121. This signal is then gated by the -VALID STROBE and VALID STROBE signals which cause AND function gates 123 and 121 to apply a logic level 1 signal to the D input of D-type flip-flops 127 and 128, respectively. These flip-flops are then clocked by the -READY STROBE signal which causes them to provide a logic level 0 signal at their Q outputs. AND function gates 120 and 122 then provide a logic level 1 signal in response to those logic level 0 signals and logic level 0 valid strobe and even and odd signals from the other subsystem. NOR gate 132 responds to these logic level 1 signals from either or both of AND function gates 120 and 122 by applying a logic level 0 signal to the D input of flip-flop 133. On the next positive going edge of the -READY STROBE signal, logic level 0 and 1 signals appear at the Q and $\overline{Q}$ outputs, respectively of flip-flop 133. Consequently, these signals also appear at the J and K inputs of J-K flip flop 130.

On the next negative going edge of the PROCESSOR CLK signal logic level 0 and 1 signals are clocked into flip-flop 130, causing logic level 0 and 1 signals to be provided at the Q and $\overline{Q}$ outputs, respectively of flip-flop 130. Consequently; a logic level 0 -READY signal appears on lead 134 allowing the microprocessor associated with each synchronization circuit to leave the wait state and continue operating in synchronism with each other.

The logic level 1 signal at $\overline{Q}$ output of flip-flop 130 is applied to the first input of NAND gate 129 which then provides a logic level 0 -INSTR CLR signal when a logic level 1 -PROCESSOR CLKB signal appears at the other input of this NAND GATE. This logic level 0 -INSTR CLR signal resets flip-flops 105, 127 and 128 and sets flip-flop 133, thereby allowing the synchronization circuit to be initialized for synchronization of the next asynchronous ready signal. Thus, the logic level 0 -READY signal forces both microprocessors to synchronously leave the wait state.

Since flip-flop 133 was set by signal -INSTR CLR, its Q and $\overline{Q}$ outputs are set to 0 and 1, respectively. Since these signals also appear at the J and K inputs of J-K flip-flop 130, logic level 1 and 0 signals are clocked into this flip-flop in response to the negative going edge of the PROCESSOR CLK signal. Consequently, logic level 1 and 0 signals also appear at the Q and $\overline{Q}$ outputs, respectively, of flip-flop 130. A logic level 1 -READY signal then appears at the Q output of flip-flop 130, thereby meeting hold time requirement of the microprocessors such as the Intel 80286.

The synchronization circuit of the present invention thus synchronizes the asynchronous ready signals for two different subsystems by eliminating the skew caused by gate propagation delays. The VALID STROBE and -VALID STROBE signals are used to prevent a race condition from causing erroneous asynchronous ready conditions to be clocked into synchronization flip-flop 133. It is possible, due to the asychronous nature of the asynchronous ready signals, that such a signal for one subsystem could become true before the same signal for the other system becomes true. Such a signal would then be clocked into flip-flop 127 or 128 of one subsystem and not the other.

If the VALID STROBE and -VALID STROBE signals were not used, the subsystem whose asynchronous ready signal did not occur would provide a logic level 1 -ODD FF TO OTHER SUBSYSTEM signals. On the next -READY STROBE signal, it would be possible that, due to propagation delays in the ready strobe generating circuits, the subsystem whose asynchronous ready signal had not occurred, could be clocked four nanoseconds prior to the other lagging subsystem but a -READY condition would be clocked into flip-flop 133 of that subsystem because both 133 flip-flops are clocked simultaneously. Flip-flop 127 of the leading subsystem could, after only one nanosecond, become set and cause a logic level 0 -ODD FF TO OTHER SUBSYSTEM signal to be sent to the other synchronization circuit of the lagging subsystem whose 127 flip-flop had been clocked by a previous -READY STROBE signal.

Three nanoseconds later the lagging subsystem's synchronization circuit could be clocked by the slower -READY STROBE signal. Since the lagging subsystem's 127 flip-flop was previously clocked true, and gate delays of only two nanoseconds stand between the -OTHER SUBSYSTEM'S ODD FF signal from the leading subsystem, and the lagging subsystem's 133 flip-flop, the -READY STROBE signal will clock a true signal into the lagging subsystem's 133 flip-flop, causing the associated microprocessor to leave the wait state before the other microprocessor.

The VALID STROBE and -VALID STROBE signal prevent this race condition from happening by inhibiting AND function gates 120 and 122 until both synchronization circuits have been clocked by the -READY STROBE signal. The use of the valid strobe signals may require an extra wait period during each instruction cycle. However, this extra wait period is held to a minimum with the arrangement of the present invention since it utilizes odd and even flip-flops 127 and 128. The input signals for these flip-flops are derived from either the VALID STROBE or -VALID STROBE signals, thereby ensuring that the asynchronous ready signals are gated as soon as they exist.

Thus, the synchronization circuit of the present invention, when arranged in a master-slave configuration, enables duplicated microprocessors to be synchronized such that they execute the same instructions at the same time, even when an asynchronous ready signal from an external asynchronous device is detected.

It will be obvious to those skilled in the art that numerous modifications of the present invention can be made without departing from the spirit of the invention which shall be limited only by the scope of the claims appended hereto.

What is claimed is:

1. A synchronization circuit for use in a computer system including duplicated microprocessors, duplicated subsystems and duplicated synchronization circuits configured in a master-slave arrangement each synchronization circuit being connected with one of said microprocessors and one of said subsystems, said microprocessors being operated to provide clock pulses and periodic instruction status signals, and said subsystems being operated to provide an asynchronous ready signal, said synchronization circuit comprising:

clock pulse storage means connected to said associated microprocessor and operated in response to said clock pulses to provide divided clock pulses;

status signal storage means connected to said associated microprocessor and operated in response to said status signal to provide a stored status signal;

asynchronous ready signal storage means connected to said associated subsystem, said clock pulse storage means and said status signal storage means, and operated in response to said asynchronous ready signal, one of said divided clock pulses and one of said stored status signals from the same synchronization circuit when operated as a master synchronization circuit, or from the master synchronization circuit when operated as a slave synchronization circuit, to provide a stored asynchronous ready signal; and synchronization means connected to the other synchronization circuit, said clock pulse storage means, the said status signal storage means and said asynchronous ready signal storage means and operated in response to one of said divided clock pulses, one of said stored status signals and said stored asynchronous ready signal from said asynchronous ready signal storage means in both the same and the duplicated synchronization circuits to provide a synchronized ready signal.

2. A synchronization circuit as claimed in claim 1, wherein said clock pulse storage means comprises a flip-flop.

3. A synchronization circuit as claimed in claim 1, wherein said clock pulse storage means comprises a J-K flip-flop having a clock input connected to receive said clock pulses and further having a preset input connected to receive said status signal, whereby provision of said divided clock pulses is initiated by receipt of said status signal.

4. A synchronization circuit as claimed in claim 1, wherein said clock pulse storage means comprises a J-K flip-flop having a clock input connected to receive said clock pulses, and first and second outputs, said J-K flip-flop being operated to provide divided clock pulses at said first output and inverted divided clock pulses at said second output.

5. A synchronization circuit as claimed in claim 4, wherein said asynchronous ready signal storage means comprises:

first and second AND function gates connected to said clock pulse storage means and said subsystem, said first AND function gate being operated in response to one of said inverted divided clock pulses and said asynchronous ready signal to provide a first data signal, said second AND function gate being operated in response to one of said divided clock pulses and said asynchronous ready signal to provide a second data signal; and first and second D-type flip-flop each having a data input which is connected to said first and second AND function gates, respectively, and each having a clock input connected to said status signal storage means, said first and second D-type flip-flops being operated in response to said first and second data signals, respectively, and one of said stored status signals from the same synchronization circuit when operated as a master synchronization circuit, or from the master synchronization circuit when operated as a slave synchronization circuit, to provice stored asynchronous ready signals of first and second characteristics, respectively.

6. A synchronization circuit as claimed in claim 5, wherein said synchronization means comprises:
third and fourth AND function gates connected to said clock pulse storage means, and said first and second D-type flip-flops, respectively, of the same and the other synchronization circuits;
said third AND function gate being operated in response to one of said divided clock pulses and said stored asynchronous ready signal of a first characteristic from the same and the other synchronization circuits to provide a first synchronization detected signal;
said fourth AND function gate being operated in response to one of said inverted divided clock pulses and said stored asynchronous ready signal of a second characteristic from the same and the other synchronization circuits to provide a second synchronization detected signal;
an OR function gate connected to said third and fourth AND function gates and operated in response to said first and/or second synchronization detected signals to provide a gated synchronization detected signal; and
synchronization storage means connected to said status signal storage means and said OR function gate, and operated in response to said gated synchronization detected signal and one of said stored status signals from the same synchronization circuit when operated as a master synchronization circuit, or from the master synchronization circuit when operated as a slave synchronization circuit, to provide said synchronized ready signal.

7. A synchronization circuit as claimed in claim 6, wherein said synchronization storage means comprises a D-type flip-flop having a data input connected to said OR function gate and a clock input connected to said status signal storage means and operated in response to one of said stored status signals to store said gated synchronization detected signal and thereby provide said synchronized ready signal.

8. A synchronization circuit as claimed in claim 6, wherein said synchronization storage means comprises:
a D-type flip-flop having a data input connected to said OR function gate and a clock input connected to said status signal storage means and operated in response to one of said stored status signals to store said gated synchronization detected signal; and
a J-K flip-flop connected to said D-type flip-flop and having a clock input connected to said microprocessor and operated in response to one of said clock pulses to store said stored synchronization detected signal and thereby provide said synchronized ready signal.

9. A synchronization circuit as claimed in claim 1, wherein said status signal storage means comprises a flip-flop.

10. A synchronization circuit as claimed in claim 1, wherein said status signal storage means comprises a J-K flip-flop having a clock input connected to receive said status signal and J and K inputs connected to voltage sources of first and second characteristics.

11. A synchronization circuit as claimed in claim 1, wherein said status signal storage means is operated to provide a stored status signal for use by the same synchronization circuit and a stored status signal for use by the other synchronization circuit.

12. A synchronization circuit as claim in claim 11, wherein said status signal storage means comprises:
a flip-flop and first and second gating means connected to said flip-flop and said microprocessor, said flip-flop being operated in response to said status signal to provide a storage signal;
said first gating means being operated in response to said status signal or said storage signal to provide said stored status signal for use by the same synchronization circuit; and
said second gating means being operated in response to said status signal or first storage signal to provide said stored status signal for use by the other synchronization circuit.

13. A synchronization circuit as claimed in claim 12 wherein said flip-flop comprises a J-K flip-flop having a clock input connected to receive said status signal and J and K inputs connected to voltage source of first and second characteristics.

14. A synchronization circuit as claimed in claim 12, wherein said microprocessor is further operated to provide inverted clock pulses and inverted status signals;
said first gating means being operated in response to one of said inverted clock pulses and said inverted status signal, or one of said inverted clock pulses and said storage signal to provide said stored status signal for use by the same synchronization circuit; and
said second gating means being operated in response to one of said inverted clock pulses and said inverted status signal, or one of said inverted clock pulses and said storage signal, to provide said stored status signal for use by the other synchronization circuit.

15. A synchronization circuit as claimed in claim 11, wherein said status signal storage means comprises a flip-flop.

16. A synchronization circuit as claimed in claim 11, wherein said status signal storage means comprises a J-K flip-flop having a clock input connected to receive said status signal and J and K inputs connected to voltage sources of first and second characteristics.

17. A synchronization circuit as claimed in claim 1, wherein said status signal storage means comprises:
a flip-flop and gating means connected to said flip-flop and said microprocessor, said flip-flop being operated in response to said status signal to provide a storage signal; and
said gating means being operated in response to said status signal or said storage signal to provide said stored status signal.

18. A synchronization circuit as claimed in claim 17, wherein said flip-flop comprising a J-K flip-flop having a clock input connected to receive said status signal and J and K inputs connected to voltage sources of first and second characteristics.

19. A synchronization circuit as claimed in claim 17, wherein said microprocessor is further operated to provide inverted clock pulses and inverted status signals, said gating means being operated in response to one of said inverted clock pulses and said inverted status signal, or one of said inverted clock pulses and storage signal, to provide said stored status signal.

20. A synchronization circuit as claimed in claim 1, wherein said synchronization means comprises:
    gating means connected to said asynchronous ready signal storage means of the same and the other synchronization circuits and to said clock pulse storage means, and operated in response to one of said divided clock pulses and said stored asynchronous ready signals from the same and the other synchronization circuits, to provide a synchronization detected signal; and
    synchronization storage means connected to said gating means and said status signal storage means and operated in response to said synchronization detected signal and one of said stored status signals from the same synchronization circuit when operated as a master synchronization circuit, or from the master synchronization circuit when operated as a slave synchronization circuit, to provide said synchronized ready signal.

21. A synchronization circuit as claimed in claim 20, wherein said synchronization storage means comprises a D-type flip-flop having a data input connected to said gating means and a clock input connected to said status signal storage means and operated in response to one of said stored status signals to store said synchronized ready signal.

22. A synchronization circuit as claimed in claim 20, wherein said synchronization storage means comprises:
    a D-type flip-flop having a data input connected to said gating means and a clock input connected to said status signal storage means and operated in response to one of said stored status signals to store said synchronization detected signal and thereby provide a stored synchronization detected signal; and
    a J-K flip-flop connected to said D-type flip-flop and having a clock input connected to said associated microprocessor and operated in response to one of said clock pulses to store said stored synchronization detected signal and thereby provide said synchronized ready signal.

23. A synchronization circuit as claimed in claim 1, wherein said asynchronous ready signal storage means comprises:
    an AND function gate connected to said clock pulse storage means and said subsystem and operated in response to one of said divided clock pulses and said asynchronous ready signal to provide a data signal; and
    a D-type flip-flop having a data input connected to said AND function gate and a clock input connected to said status signal storage means, and operated in response to said data signal and one of said stored status signals from the same synchronization circuit when operated as a master synchronization circuit, or from the master synchronization circuit when operated as a slave synchronization circuit, to provide said stored asynchronous ready signal.

* * * * *